UNITED STATES PATENT OFFICE.

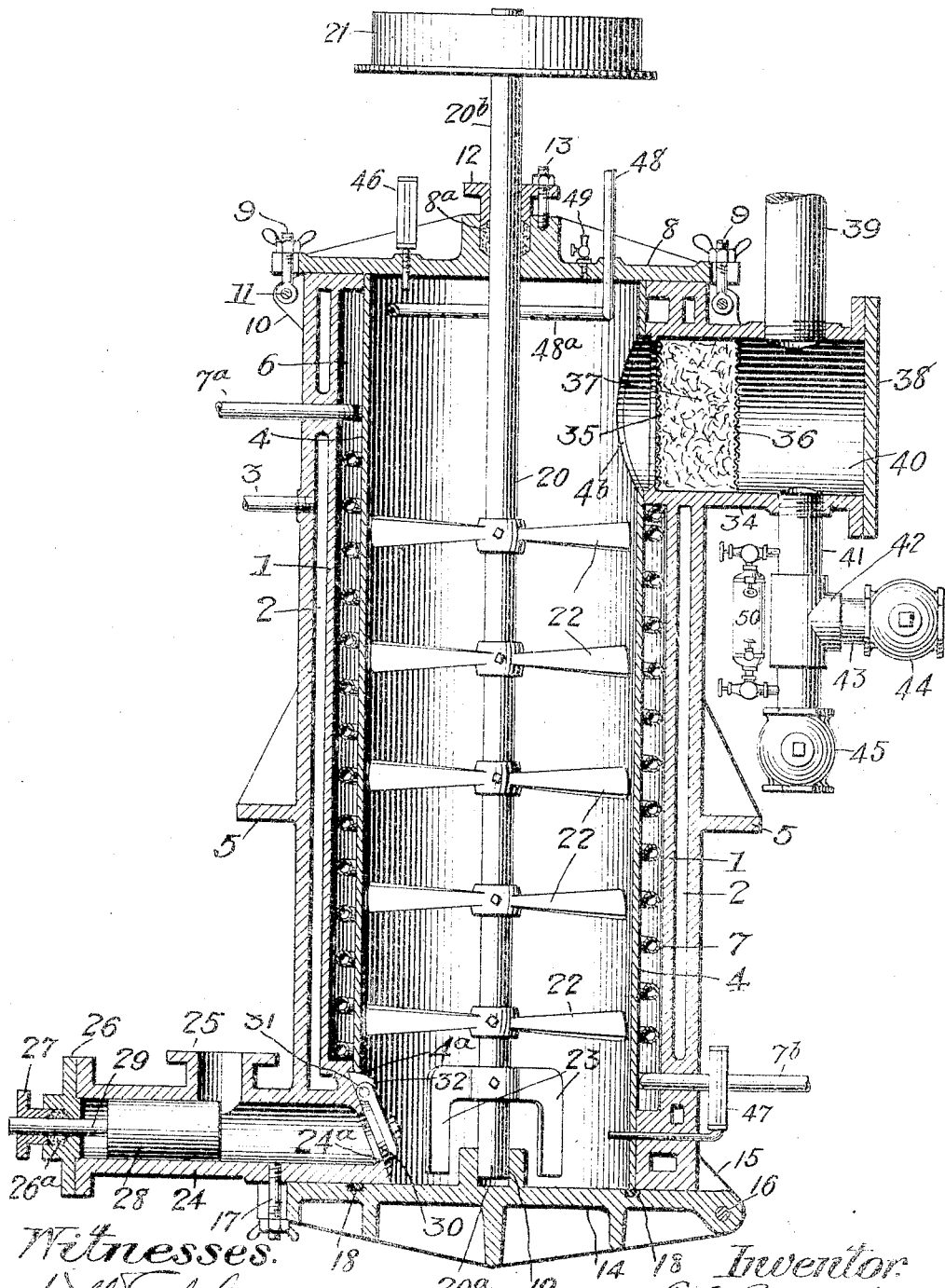

EUGENE ERLE BATTELLE, OF WAILUKU, TERRITORY OF HAWAII.

PROCESS FOR RECOVERY OF CANE-SUGAR.

1,044,003.  Specification of Letters Patent.  Patented Nov. 12, 1912.

Application filed July 17, 1909. Serial No. 508,139.

*To all whom it may concern:*

Be it known that I, EUGENE ERLE BATTELLE, a citizen of the United States, residing at Wailuku, county of Maui, Territory of Hawaii, have invented certain new and useful Improvements in Processes for Recovery of Cane-Sugar; and I do hereby declare the following to be a full, clear, and exact description of the invention, such as will enable others skilled in the art to which it appertains to make and use the same.

My invention relates to processes for the recovery of cane sugar, and particularly to a process for the manufacture of raw sugars from juices, syrups, molasses and massecuites containing glucose, known as invert sugar; and has for its objects, the elimination of glucose, the increasing of the purities of the materials, the production of a single grade of marketable sugar, and the extraction of a maximum amount of sugar from solutions with a minimum loss of the sugar contained in the initial material.

The invention consists in the novel process, as hereinafter set forth and claimed.

My process can be carried out in existing sugar factories with economical results. The glucose is eliminated by addition of sufficient alkaline earths, boiling and filtering, the solution being boiled previous to a treatment with carbonic acid, as hereinafter explained. By the elimination of the glucose, the purities of all materials are increased. A saving of sugar is effected, the recovery of which was heretofore prevented by the presence of glucose in the molasses, glucose forming and decomposing with the lime. The production of a single grade of sugar, made possible by my process, effects a saving in equipment, in labor, and in the time required for manufacture, as the remelting, reboiling, redrying and rehandling of several grades of sugar are obviated.

In the ordinary process of manufacturing raw sugar, the cane juice is limed to neutrality, heated to or near the boiling point, filtered either by decantation or other means, the juice concentrated and boiled to grain, the latter operation being repeated until there is no longer a profitable recovery of sugar, and finally the exhausted or waste molasses still containing from 30% to 40% cane sugar is disposed of at little or no profit. All the products from juice to exhausted molasses being more or less rich in glucose, increases the number of boilings (grades of sugar) and makes it impossible to recover more sugar from the above mentioned exhausted molasses.

In carrying out my improved process, the raw juice is limed with quick lime, milk of lime, saccharate of lime, or its equivalent of the alkaline earth group, to from 1% to 5% of the weight of the juice. It is then boiled, either by pumping through a heater, or by other means of attaining this end. No definite amount of alkali can be specified as the percentage of glucose is variable, but sufficient alkalinity is maintained to completely destroy all traces of glucose after the solution is boiled. After boiling, the hot solution is run into a carbonatation tank, where acid preferably carbonic acid is passed through it until a filtered sample of the solution shows an alkalinity of from .05% to .2%, when the carbonic acid is stopped, and the solution is then filtered, either by decantation or by mechanical means. In the former case, the precipitate is filter pressed. The resulting filtered liquid is now sent to a second carbonatation tank, where the alkalinity is increased if desired, and carbonic acid is again passed through the solution until all or nearly all of the metal is thrown down as carbonate.

In juices or sugar liquors containing a low percentage of glucose the single carbonatation is sufficient, provided that the metal in solution is completely, or nearly so, removed by continued carbonic acid application. In either case the filtered solution is now concentrated to syrup.

The invention so far as above disclosed applies not only to the manufacture of raw sugar, but it may also be employed in connection with the refining processes now in use. Should the raw sugar to be refined contain glucose, the remelt sugars, syrups, molasses or massecuites, may be treated by the above described process to decompose the invert sugar, the latter passing away with the sludge or press-cake.

After evaporating the solutions (juices or other sugar house products) by any of the devices now in use to a syrup, the latter is boiled to grain in vacuum pans, yielding a massecuite of about the same purity as that of the carbonated juice. After remaining in crystalizers from 12 to 24 hours, and then separating in centrifugal machines, this massecuite yields a high purity raw sugar and a high purity molasses.

In all succeeding strikes or boilings syrup or thick juice is used as in the first case only in smaller amounts, the first molasses being boiled in on same at the finish of the strike, to lower the purity of the massecuite to from 70 to 75 purity. No definite proportions of syrup and molasses can be specified owing to the varied purities of either or both of same; but the object is to boil the first or only molasses produced in on the grain made with high purity syrup in such proportions as to yield a single grade of massecuite of from 70 to 75 purity, which, after treatment in crystallizers for 12 to 24 hours, and the crystals separated from the molasses by centrifugals, yields a sugar of from 96 to 98 polarization and molasses of from 50 to 60 purity. As the molasses of this purity accumulates it is diluted with water to 1.05 to 1.06 specific gravity, and then limed with milk of lime added in the proportion of one part CaO to every five parts of sugar in solution.

In some troublesome cases when the purity of the saccharate cake is low, it is advisable to allow this solution to stand for a half hour after agitating, and filter at atmospheric temperature, discarding the precipitate after washing in filter, and make up the deficiency of the lime removed, or treat the molasses with lime and carbonic acid as under heat of juice. In any case, the diluted molasses is now treated in the restitution filter hereinafter described.

Reference is to be had to the accompanying drawing, which represents a vertical sectional view of the restitution filter employed in my process.

The cylindrical body 1 is preferably a casting provided with a jacket chamber 2 from which the air may be exhausted through the pipe 3. A liner 4, of tubing or the like, is fitted inside of the body 1, leaving an annular chamber 6 between them. A coil 7 is inclosed in the chamber 6, the ends $7^a$ $7^b$ are passed through the body 1. A cover 8 is provided, which can be removably secured to the top of the body 1 by means of the swing bolts 9 hinged to the lugs 10 by the pins 11. The cover 8 is provided with a stuffing-box $8^a$, a gland 12 and studs 13. The bottom door 14 is hinged to lugs 15 by the pin 16 and may be closed to the body 1 by the studs 17. A gasket 18 may be interposed. A step box 19 is provided above the center of the door 14. A stirrer shaft 20 is passed through the gland 12, the stuffing-box $8^a$ and the cover 8. Its lower end $20^a$ is supported by the step box 19. The shaft 20 is revolved by any suitable means, for example by a belt on the pulley 21. Paddles or arms 22 are secured at intervals on the shaft 20, and downwardly extending arms 23 are secured to said shaft near its end $20^a$. Its upper end $20^b$ is made long enough to permit of the cover 8 being raised to obtain access to the interior of the apparatus. A small horizontal cylinder 24 is provided near the bottom of the body 1. This cylinder 24 is provided with a nozzle 25 on its upper side preferably, a head 26 with stuffing-box $26^a$ and a gland 27. A piston 28 with rod 29 are provided, a reciprocating motion of same being obtained in any well known manner. The check valve 30, hinged by the pin 31 to lugs 32 on the inside of the body 1, is adapted to seat against the seat $24^a$ at the inner end of the cylinder 24. The lower end of the liner 4 is cut away at $4^a$ to clear the lugs 32 and seat $24^a$.

The nozzle 34 is provided near the upper end of the body 1. A hole $4^b$ is cut in the liner 4 to register with the opening in said nozzle. Screens 35 36 are provided in the nozzle 34, and the space between said screens is filled by any suitable filtering medium 37. A cover 38, removably attached to the nozzle 34, affords access to the filter. A chamber 40 is formed in the nozzle 34 between the screen 36 and the cover 38. A pipe 39 may connect the chamber 40 with a vacuum pump. The pipe 41, provided with a T 42, is screwed into the bottom of the nozzle 34 to drain the chamber 40. The pipe 43 provided with a stop cock 44 is connected to the T 42 for wash water discharge. A stop cock 45, attached to the pipe 41, is connected by piping to any suitable seal for the discharge of waste molasses. The thermometers 46 47 are provided in the cover 8 and near the bottom of the body 1 respectively. A pipe 48 with holes $48^a$ may be placed under the cover 8 for spraying juice or other liquid. A cock 49 may be screwed into the cover 8 for breaking the vacuum. A proof gage 50 is provided connected to the pipe 41.

In operation, the door 14 being closed and secured by the studs 17, the cover 8 is raised, and the space inside of the liner 4 is filled with a body of pulverized metallic oxid of alkaline earth, preferably calcium, up to within about six inches of the bottom of the hole $4^b$. The cover 8 is then lowered and secured to the body 1 by the swing bolts 9. The temperature of the metallic oxid is then lowered, by a cooling medium passed through the coil 7, to 10° or 12° C. as indicated by the thermometers 46 and 47. A saving may be effected by maintaining a vacuum in the chamber 2. The shaft 20 is now revolved. Diluted molasses, of from 1.05 to 1.06 specific gravity, previously cooled to 10° or 12° C., is now admitted through the nozzle 25. The reciprocating motion of the piston 28 forces the cold molasses into the interior of the liner 4, passing through between the check valve 30 and the seat $24^a$, and mixing with the metallic oxid. The speed of the piston 28 is so regulated that the molasses passing through the oxid shall require from a half to one hour to pass in through the check valve and out through the filtering material 37. The vacuum maintained, by connecting the pipe 39 with a vacuum pump, increases the efficiency of the apparatus, but it can be worked without it.

During the passage of the cold molasses through the cold metallic oxid of alkaline earth, an insoluble metallic saccharate cake is formed, retaining almost all the cane sugar, while the non sugars together with a very small amount of cane sugar pass off in the mother liquid through the filter 37 and are discarded through the pipe 41, the cock 45 being open. At intervals during this operation, the filtrate or mother liquid as it passes off will be found to have a specific gravity of from 1.02 to 1.03, indicated from samples drawn from the proof gage 50. As soon as the density of the filtrate starts to increase, showing that the metallic oxid will remove no more cane sugar from the solution, the admission of molasses to the nozzle 25 is stopped and cold water is admitted instead. Cock 44 is opened and cock 45 closed. The saccharate within the apparatus is washed with said cold water (10° to 12° C.) until, in the opinion of the operator, the non-sugars surrounding and held within the saccharate cake are sufficiently washed out. The wash water as soon as it is discharged through the pipe 43 may be used in diluting the heavy molasses that will be subjected to a repetition of this restitution filter portion of the process.

The admission of cold water through the nozzle 25 and the motion of the piston 28 being stopped, the pipe 39 is closed and the vacuum broken by the cock 49. The door 14 is now opened, and the saccharate cake is discharged from the apparatus, the operation being aided by hot juice through the sprinkler pipe 48. The saccharate cake is diluted with hot juice, or other suitable liquids, and is pumped up to be added to raw juice as a clarifying agent where the sugar is set free from saccharate by carbonic acid along with the juice. A large percentage of sugar is thus recovered that otherwise would be run to waste.

I claim:

1. A process for the recovery of cane sugar, which consists in eliminating the glucose of a cane sugar solution, boiling to grain and thereby recovering a glucose-free cane sugar molasses, and recovering a further amount of sugar from such molasses by passing the latter through a body of alkaline earth in solid form, substantially as described.

2. A process for the recovery of sugar from cane sugar molasses, which comprises passing a quantity of molasses cooled to from 10° to 12° C., through a body of cold oxid of alkali earth metal, substantially as described.

3. A process for the recovery of sugar from cane sugar molasses, which comprises sucking diluted cane sugar molasses of from 1.05 to 1.06 specific gravity, and having a temperature of from 10° to 12° C., through a body of cold oxid of alkali earth metal, substantially as described.

4. A process for the recovery of sugar from glucose-free cane sugar molasses, which comprises passing such molasses through a body of cold alkaline earth, thereby forming a saccharate cake, washing such cake and diluting with hot juice, and then adding the saccharate to raw juice from which the sugar is then set free by carbonic acid, substantially as described.

In testimony whereof I affix my signature, in presence of two witnesses.

EUGENE ERLE BATTELLE.

Witnesses:
A. M. NOWELL,
GEO. N. WEIGHT.